No. 633,300. Patented Sept. 19, 1899.
C. WEGENER.
FURNACE FOR BURNING REFUSE.
(Application filed Apr. 22, 1899.)
(No Model.)
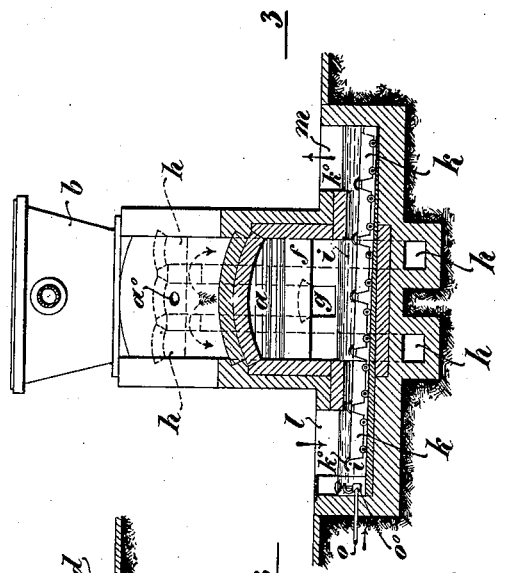
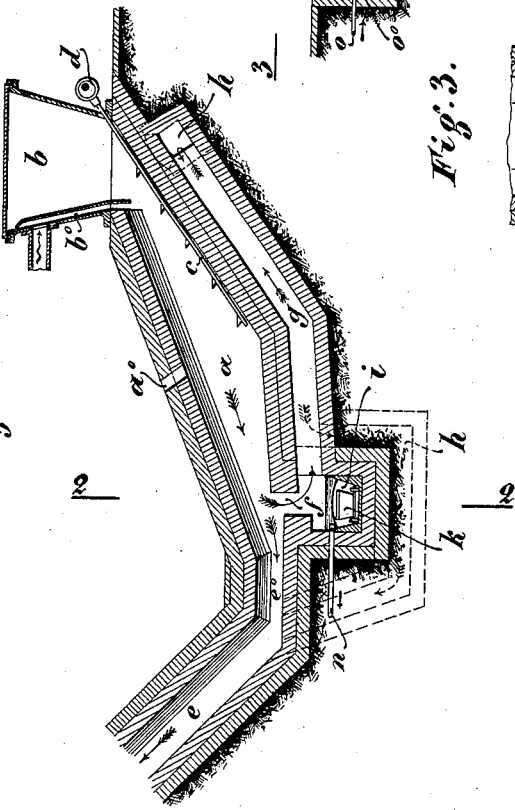
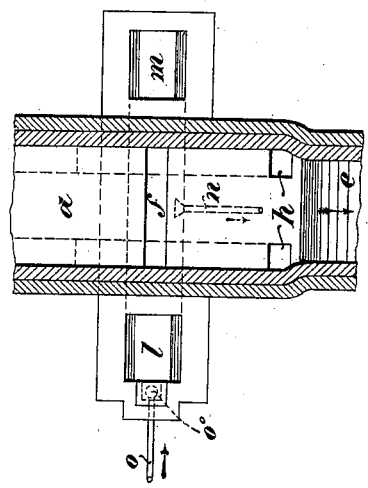
Inventor
Carl Wegener
By Philipp Phelps Sawyer
Attys
Attest
T. F. Kehoe
Jno. Borst

UNITED STATES PATENT OFFICE.

CARL WEGENER, OF BERLIN, GERMANY.

FURNACE FOR BURNING REFUSE.

SPECIFICATION forming part of Letters Patent No. 633,300, dated September 19, 1899.

Application filed April 22, 1899. Serial No. 714,003. (No model.)

*To all whom it may concern:*

Be it known that I, CARL WEGENER, engineer, a subject of the King of Prussia, German Emperor, and a resident of Berlin, Prussia, German Empire, have invented new and useful Improvements in Furnaces for Burning Refuse, of which the following is a specification.

The present invention has for its object to utilize in furnaces for the destruction of refuse by the melting of the incombustible parts of the refuse the heat of the combustion-gases for heating the furnace.

The invention is illustrated in the annexed drawings.

Figure 1 is a longitudinal section through the middle of the furnace; Fig. 2, a transverse section on the line 2 2 of Fig. 1, and Fig. 3 a horizontal section on the line 3 3 of Fig. 2.

The furnace $a$ is supplied through the opening $a^0$ with coal-dust and air and through the hopper $b$ with the refuse to be destroyed and is also supplied with air through the chamber $b^0$, attached to the hopper. Both supplies of air for combustion are preferably previously heated by means of the escaping gases from the furnace. The descent of the refuse to the middle of the furnace is assisted by means of a mechanical stirring device consisting of bars $c$, provided with claws, which are worked to and fro by means of the shaft $d$, provided for this purpose with eccentrics. The furnace-space $a$ and the flue $e$ for the escaping gases, which flue is preferably led to the heating-chamber of a steam-boiler, are connected by means of a passage $e^0$, contracted so as to cause a portion of the gases to pass through the opening or slit $f$ in the floor of the furnace, through which the molten slag falls. The gases thus passing through the opening $f$ enter a central flue $g$, which passes rearwardly beneath the sole of the furnace and communicates at its rear end with two flues $h$, one at each side of it, which conduct the gases beyond the contracted portion $e^0$ also to the exit-flue. Beneath the opening $f$ is placed the water-trough $i$, upon the sloping bottom of which the bogies $k$ move automatically from the entrance-point $l$ to the exit-point $m$. The middle part of the row of bogies is underneath the slag-outlet $f$. The spaces between the several bogies are covered by plates $k^0$, which are fixed to the bogies, so that the whole of the slag discharged is passed into the bogies. The water contained in the trough $i$ may be drawn off through the pipe $n$ as soon as it becomes heated and may be used as feed-water for a boiler, while the inlet-pipe $o$ is automatically opened and closed according to requirements by means of a ball-cock $o^0$.

What I claim is—

The combination of a furnace, an exit-flue, and central and side flues, extending beneath the sole of the furnace, the exit-flue being provided with a contracted portion next to the furnace and the floor of the furnace being provided with an opening adjacent to said contracted portion, providing communication between the furnace and the central flue beneath the same, substantially as and for the purpose described.

In testimony whereof I have hereunto set my hand in presence of two subscribing witnesses.

CARL WEGENER.

Witnesses:
 WALDEMAR HAUPT,
 HENRY HASPER.